UNITED STATES PATENT OFFICE.

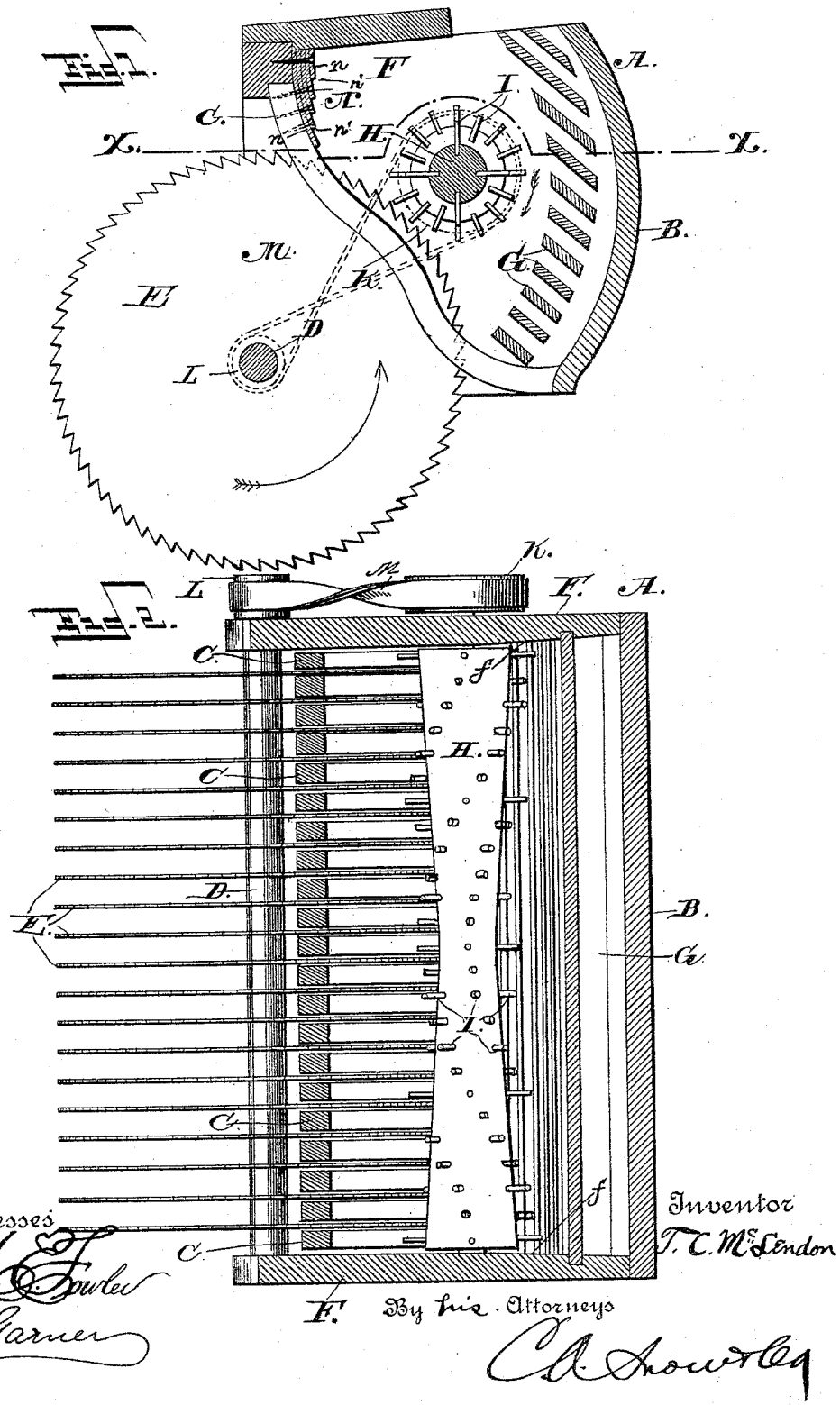

THADDEUS C. McLENDON, OF CONSTITUTION, GEORGIA.

COTTON-GIN.

SPECIFICATION forming part of Letters Patent No. 414,434, dated November 5, 1889.

Application filed November 13, 1886. Renewed September 17, 1889. Serial No. 324,177. (No model.)

*To all whom it may concern:*

Be it known that I, THADDEUS C. McLENDON, a citizen of the United States, residing at Constitution, in the county of De Kalb and State of Georgia, have invented new and useful Improvements in Cotton-Gins, of which the following is a specification.

My invention relates to cotton-gins; and it consists in the peculiar construction and combination of devices that will be more fully set forth hereinafter, and particularly pointed out in the claims.

In the drawings, Figure 1 is a vertical longitudinal sectional view of portions of a cotton-gin embodying my improvements. Fig. 2 is a horizontal longitudinal sectional view of the same, taken on the line $x\ x$ of Fig. 1.

A represents the roll-box, which is provided with the curved outer side B.

C represents the ribs, which are arranged in the inner side of the roll-box.

D represents the saw-arbor, and E represents the gin-saws, the inner edges of which extend between the ribs C and enter the rear side of the roll-box, as shown. The ends F of the roll-box converge rearwardly toward the saws, as shown at $f$ in Fig. 2, and in the said ends of the roll-box and arranged concentrically, or nearly so, with the curved side B thereof are a series of inclined recesses, in which are placed the ends of the longitudinal inclined slats G. These slats are arranged at suitable regular distances apart, thereby leaving openings between them and forming downwardly-inclined chutes.

H represents the roll, which is journaled longitudinally in the roll-box. The said roll is smaller at the center than at the ends and swells or inclines gradually from the center to the ends, and is provided with teeth I, arranged on spiral lines which curve rearward toward the center of the roll from the ends thereof. A pulley K is secured on one end of the spindle of the roll, and a somewhat smaller pulley L is placed on one end of the saw-arbor, and the said pulleys are connected by an endless belt M, whereby the rotation from the saw-arbor is communicated to the roll, and the latter is rotated at a lower rate of speed than the saws.

N represents a cushion, which is located in the rear upper corner of the roll-box above the saws and bears against the front upper sides of the ribs. This cushion is preferably made of a series of leaves $n$, (of rubber or other elastic material,) placed one upon another and fastened together by nails or screws or in any other suitable manner, each leaf being progressively narrower than the leaf on its rear side, so that a series of ascending shoulders $n'$ are formed on the front side of the cushion.

The operation of my invention is as follows: The cotton which is fed into the box is caught by the teeth of the roller and carried round and round in the roll-box. Owing to the spiral disposition of the roller-teeth and to the fact that the roller tapers from its ends to its center, the cotton is forced toward the center of the roller as the same revolves, and is thus prevented from clogging in the ends of the box at $f$. As the cotton emerges from between the teeth of the roller and the gin-saws it is lifted by the cushion from the ribs and prevented from pressing so tightly thereupon as to become cut and injured or cause the saw-teeth to become twisted, which is a very great advantage, as cotton-gins now commonly in use are extremely liable to become clogged, especially if the cotton is damp. As the cotton is lifted from the ribs it strikes against the shoulders of the yielding cushion and is rebounded forward by the same, and thus prevented from becoming packed in the rear upper corner of the roll-box. As the roll of cotton revolves in the roll-box it is alternately compressed and expanded longitudinally, as will be readily seen, thus causing continuous new surfaces to be presented to the saw-teeth, and thereby causing the saws to operate with maximum efficacy.

The cotton-gin thus constructed causes the cotton or lint to be pulled off from the seeds by the saws and not cut thereby, is not liable to choke, and thoroughly dislodges the dirt and trash from the cotton while it is being ginned, thus making a white clean lint that is superior in quality and commands the highest price in the market.

Having thus described my invention, I claim—

1. The combination of the roll-box having the converging ends F, the ribs C, the saws, and the rotating roll H, journaled in the roll-box, having its ends of greater diameter than its center and gradually tapered from its ends to the center, and provided with the teeth I, arranged on spiral lines which curve rearward toward the center of the roll from the ends thereof, substantially as described.

2. In a cotton-gin, the roll-box provided with the inclined series of slats G, arranged to discharge the trash and dirt as it is dislodged from the cotton, substantially as described.

3. In a cotton-gin, the rotating roll H, having its ends of greater diameter than its center and gradually tapered from its ends to the center, for the purpose set forth, substantially as described.

4. The combination of the roll-box with the rotating roll H thereon, said roll having the teeth I, arranged on spiral lines which curve rearward toward the center of the roll from the ends thereof, substantially as described.

5. In a cotton-gin, the roll-box having the elastic cushion provided with the shoulders $n'$ on its front side, substantially as described.

6. In a cotton-gin, the roll-box having the elastic cushion made of a series of leaves $n$, substantially as described.

7. In a cotton-gin, the roll-box having the elastic cushion made of a series of leaves $n$ fastened together, the said leaves being of different widths, and thereby forming the shoulders $n'$, substantially as described.

In testimony that I claim the foregoing as my own I have hereto affixed my signature in presence of two witnesses.

THADDEUS C. McLENDON.

Witnesses:
FRANK M. MYERS,
GEO. B. FORBES.